(12) United States Patent
Pies

(10) Patent No.: US 9,297,710 B1
(45) Date of Patent: Mar. 29, 2016

(54) METHOD AND DEVICE FOR DETECTING IMPACT EVENTS ON A SECURITY BARRIER WHICH INCLUDES A HOLLOW REBAR ALLOWING INSERTION AND REMOVAL OF AN OPTICAL FIBER

(71) Applicant: Ross E. Pies, Hillsboro, OR (US)

(72) Inventor: Ross E. Pies, Hillsboro, OR (US)

(73) Assignee: U.S. Department of Energy, Washington, DC (US)

( * ) Notice: Subject to any disclaimer, the term of this patent is extended or adjusted under 35 U.S.C. 154(b) by 126 days.

(21) Appl. No.: 14/093,627

(22) Filed: Dec. 2, 2013

(51) Int. Cl.
*G01L 7/00* (2006.01)
*G01L 1/24* (2006.01)

(52) U.S. Cl.
CPC ..................................... *G01L 1/245* (2013.01)

(58) Field of Classification Search
CPC ............................... G08B 21/0461; G01L 7/00
USPC ....................... 250/227.14, 227.16, 221, 239; 73/705–715; 340/555–557; 356/73.1; 385/11–13
See application file for complete search history.

(56) References Cited

U.S. PATENT DOCUMENTS

| | | | | |
|---|---|---|---|---|
| 5,026,141 A | * | 6/1991 | Griffiths | ........................ 385/13 |
| 6,876,786 B2 | * | 4/2005 | Chliaguine et al. | ............. 385/13 |
| 7,980,606 B2 | * | 7/2011 | Takahashi et al. | ............ 293/117 |

* cited by examiner

*Primary Examiner* — Que T Le
(74) *Attorney, Agent, or Firm* — Jacob A. Heafner; Brian J. Lally; John T. Lucas

(57) ABSTRACT

A method and device for the detection of impact events on a security barrier. A hollow rebar is farmed within a security barrier, whereby the hollow rebar is completely surrounded by the security barrier. An optical fiber passes through the interior of the hollow rebar. An optical transmitter and an optical receiver are both optically connected to the optical fiber and connected to optical electronics. The optical electronics are configured to provide notification upon the detection of an impact event at the security barrier based on the detection of disturbances within the optical fiber.

17 Claims, 4 Drawing Sheets

METHOD AND DEVICE FOR DETECTING IMPACT EVENTS ON A SECURITY BARRIER WHICH INCLUDES A HOLLOW REBAR ALLOWING INSERTION AND REMOVAL OF AN OPTICAL FIBER

GOVERNMENT INTERESTS

The United States Government has rights in this invention pursuant to the Employer-Employee Relationship with the inventor.

FIELD OF THE INVENTION

The present invention relates to a method and device for the detection of impact events on a security barrier. Preferably, the present invention is used to secure airports, secure-checkpoints or more preferably power distribution centers by detecting impact events at security barriers.

BACKGROUND OF THE INVENTION

Security barriers are a fundamental component deployed in securing airports, checkpoints, power distribution centers, or other secure areas. Generally these structures are made out of concrete and provide a formidable barrier against vehicles, explosives, or even personal. One such security barrier is sold under the trademark BATTLEGUARD by HIT. However, given the location and resources the barriers may not be monitored or monitored remotely simultaneously with numerous other locations.

As security barriers are the first line of defense, effective monitoring is key to effective security. Cameras are frequently used to monitor the site; however these may be easily avoided using long range weapons, hidden explosives, or simply avoiding the view of the cameras. Rural sites or site otherwise too remote or too numerous to monitor are often left completely unmonitored due to the cost of monitoring these sites, thereby creating significant vulnerabilities. Therefore, there is a need to detect impacts upon security barriers without the need for personal on site or with remote visual monitoring.

SUMMARY OF THE INVENTION

A method and device for the detection of impact events on a security barrier comprising a security barrier, a hollow rebar, a motion sensing optical fiber, an optical transmitter, an optical receiver, and optical electronics. The security barrier forms a solid structure. The hollow rebar is positioned within the security barrier, whereby the hollow rebar is completely surrounded by the solid structure of the security barrier. The optical fiber cable passing within the security barrier is completely surrounded by the hollow rebar. The hollow rebar comprises an interior. The optical fiber passes through the interior of the hollow rebar. The optical transmitter produces an optical energy.

The optical transmitter is optically connected to the optical fiber whereby the optical energy from the optical transmitter passes through the optical fiber, including the optical fiber passing within the security barrier. The optical receiver is optically connected to the optical fiber whereby the optical energy from the o ptical transmitter is received through the optical fiber. The optical transmitter and the optical receiver are connected to the optical electronics. The optical electronics comprise a computer, microcontroller, application-specific integrated circuit, an embedded system, or a combination thereof and are configured to detect disturbances within the optical fiber from the optical energy received by the optical receiver. The optical electronics have a means for providing notification of the detection of an impact event at the security barrier upon the detection of disturbances within the optical fiber exceeding a predetermined deviation threshold. Upon impact, the motion generated by the impact triggers an event that is detected by the combination of the optical transmitter, optical receiver and optical electronics and provides a notification of an impact event.

DETAILED DESCRIPTION OF THE INVENTION

Figure 1:
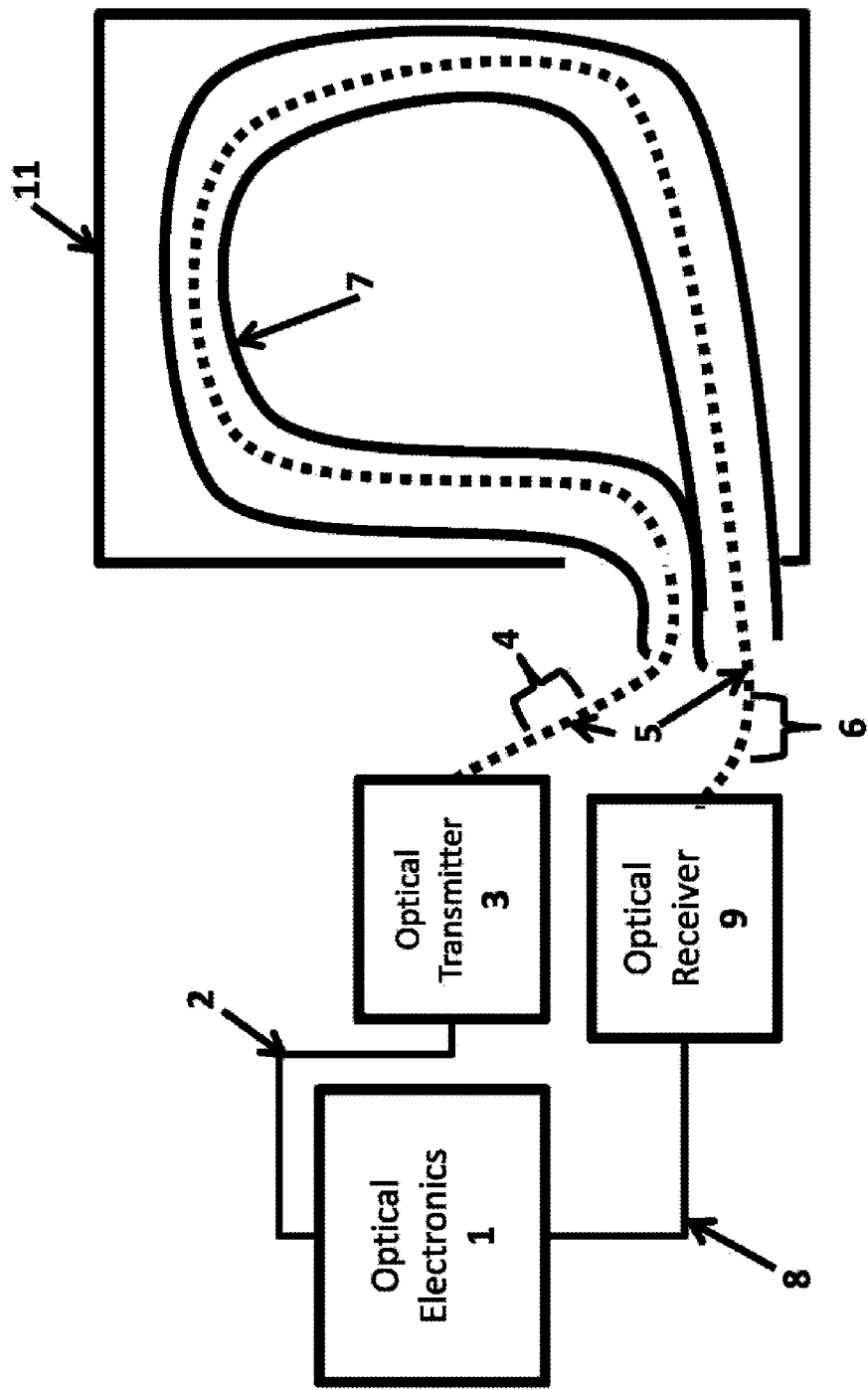
FIG. 1 depicts a cross-sectional view of one embodiment of a method and device for detecting impact events on a security barrier.
Figure 2:
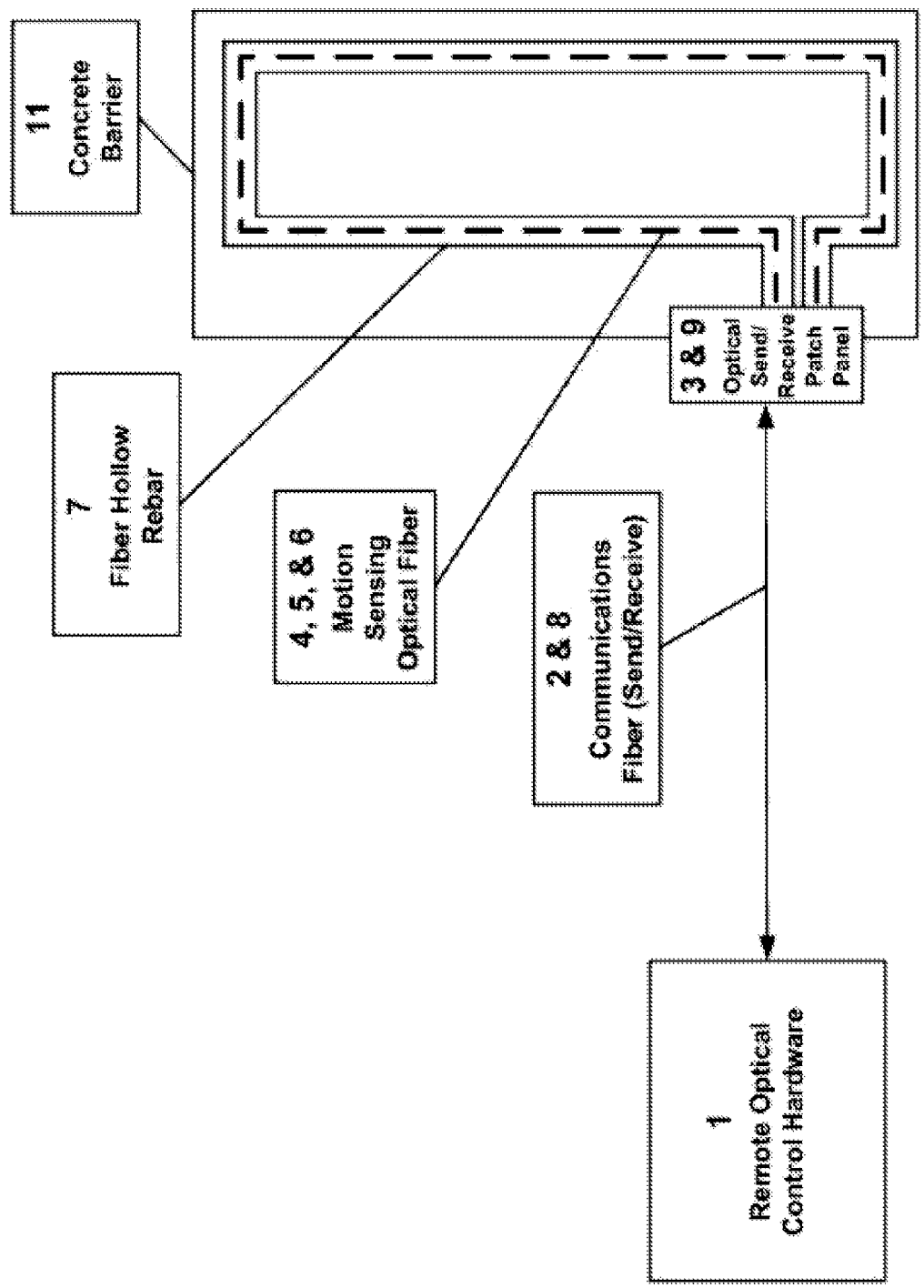
FIG. 2 depicts a top view of one embodiment of a method and device for detecting impact events on a security barrier.

FIG. 1 and FIG. 2 depict embodiments of a method and device for detecting impact events on a security barrier. As shown, FIG. 1 and FIG. 2 include optical electronics 1, an optical transmitter 3, a motion sensing optical fiber 5, hollow rebar 7, an optical receiver 9, and a security barrier 11. The optical electronics 1 are connected to the optical transmitter 3, preferably by one or more wires 2. The optical electronics 1 are also connected to the optical received 9, preferably by one o r more wires 8. The optical transmitter 3 is optically connected to the first end 4 of the optical fiber 5. The optical transmitter 3 provides an optical energy to the optical fiber 5. The optical fiber 5 is positioned within the interior of a hollow rebar 7. The hollow rebar 7 is positioned within and completely surrounded by the security barrier 11. The optical receiver 9 is optically connected to the second end 6 of the optical fiber 5. Optical energy provided by the optical source 3 passes through the optical fiber 5, within the hollow rebar 7 and within the security barrier 11, to the optical receiver 9. The optical received 9 sends a signal to the optical electronics 1 related to the optical energy received. The optical electronics 1 processes the signals from the optical receiver 9 or a combination of signals to the optical transmitter 3 and from the optical receiver 9 for disturbances from an impact event and provides notification of any detected disturbances.

Optical Electronics 1

The optical electronics 1 are any electrical device or devices that are capable of receiving a signal from the optical receiver 9. Preferably, the optical electronics 1 also control the optical transmitter 3, for example, but not limited to, powering the optical transmitter 3, optimizing the transmission time, cycle, duty cycle, wavelength, modulation, or combinations thereof.

The optical electronics 1 preferably employs any method of determining whether or not the optical energy from the optical transmitter 3 through the optical fiber 5 and received by the optical receiver 9. The optical electronics 1 is preferably a computer, microcontroller, application-specific integrated circuit, an embedded system, or a combination thereof.

The optical electronics 1 preferably includes a processing unit capable of performing calculations relating to the determination of disturbances in the optical connection through the optical fiber 5 between the optical transmitter 3 and the optical receiver 9. Preferably, the optical electronics 1 also includes a data bus, serial or parallel connection, analog-to-digital converter, or combination thereof capable of communication with the optical received 9. In one embedment, the optical electronics 1 includes the microcontroller sold under the trademark ATMEGA128 by ATMEL.

Detection of Disturbances

The optical electronics 1 detect disturbances within the optical fiber 5 from the optical energy from the optical transmitter 3 having passed through the optical fiber 5 and received by the optical receiver 9. Preferably, disturbances are detected by providing a modulated output at the optical transmitter 3 and detecting disturbances in said modulated output. Preferably, the modulation of the optical energy from the optical transmitter 3 is a known change, preferably an oscillation, of the amplitude (intensity), phase, frequency, polarization, or combination thereof. As vibrations, temperatures, sounds, pressures or other changes to the environment of the optical fiber 5 will alter the optical response of the system they will be detectable by the optical electronics 1. Therefore, when there is a deviation from the signal received at the optical receiver 5 it may be assumed that such deviation is a response from an impact event on the security barrier 11.

If a predetermined deviation threshold is exceeded, then a notification is sent. Preferably, the timing of the deviation is also recorded to identify where the deviation occurred within the optical fiber, for the determination of the location of the impact event, as well as diagnostics. Preferably, the predetermined deviation threshold is optimized for the particularly impact of interest. In one embodiment, the predetermined deviation threshold is optimized to detect small firearm fire, explosive ordinances, or a combination thereof.

In one embodiment, the predetermined deviation threshold is defined during design or after manufacture. In another embodiment, the optical electronics 1 perform a self-calibration, whereby the predetermined deviation threshold is adjusted by the optical electronics 1 to changes in the signal from the optical receiver 9 relating to the oscillating amplitude received at the optical receiver 9, for example by calculating a running average. This embodiment is preferred, as a self-calibration will allow for changes in climate, for example temperature, humidity, pressure, or a combination thereof, and any structural changes to security barrier 11 due to wear and tear.

In one embodiment, the optical electronics 1, optical fiber 5, optical receiver 9, as well as any other necessary components, deploy detection techniques using an optical fiber as described in U.S. Pat. Nos. 7,491,957, 7,792,395, and 8,363,230, Giallorenzi, T. G.; Bucaro, J. A.; Dandridge, A. Sigel, G. H.; Cole, J. H.; Rashleigh, S. C.; Priest, R. G., "Optical fiber sensor technology," *Quantum Electronics, IEEE Journal of*, vol. 18, no. 4, pp. 626,665, April 1982, or a combination thereof, all hereby fully incorporated by reference. Depending on the technique deployed, additional optical fibers, beam splitters, other optical components, or a combination thereof may be deployed.

Notification of the Detection of Impact Event

The optical electronics 1 are configured to provide notification after an impact event is identified as described above. Preferably, notification is provided by a simple audible, visual, tactical, or combination thereof alarm connected to the optical electronics 1. In one embodiment, a speaker, vibrator, light source (preferably light-emitting-diode), or a combination thereof, is electrically connected to the optical electronics 1 and is enabled by the optical electronics 1 to provide notification. The speaker, vibrator, light source (preferably light-emitting-diode), or a combination thereof is preferably enabled via a digital output of the optical electronics 1, which powers the notification means directly or indirectly (e.g. through a relay, or a signal). In another embodiment, the optical electronics 1 are connected to a larger network and the notification is a signal sent to a remote station or other network based notification, for example, but not limited to, email, text message, other network based messages, or a combination thereof. In one such embodiment, the optical electronics 1 comprises a network interface controller, cellular modem, or other communication device, which is capable of notification, for example, but not limited to via email, text message, other network based messages, or a combination thereof.

Optical Transmitter 3

The optical transmitter 3 is any means of providing optical energy to the optical fiber 5, preferably a modulated optical energy. Preferably, the optical transmitter 3 is employs a gas or solid-state laser. Preferably, the optical transmitter 3 a laser diode, a VCSEL, active or passive Q-switched lasers, or combinations thereof. Preferably, the optical transmitter 3 is a laser diode preferably producing a modulated optical energy.

Optical Fiber 5

The optical fiber 5 is any means of transferring the optical energy form the optical transmitter 3 through the hollow rebar 7 and to the optical receiver 9 whereby any movements within the hollow rebar 7, as well as the security barrier 11, will affect the resulting optical energy received. Preferably, the optical fiber 5 includes a transparent core surrounded by a transparent cladding material with a lower index of reflection, thereby forming a waveguide. Although only one optical fiber 5 is shown in FIG. 1, any number of optical fibers may be used, as described herein.

Preferably, the optical fiber 5 is made mostly of silica and more preferably with fluorozirconate, fluoroaluminate, and chalcogenide glasses, crystalline materials like sapphire, or combinations thereof. In alternate embodiments, the optical fiber 5 is made essentially of silica, fluoride, phosphates, chalcogenides, or combinations thereof.

Hollow Rebar 7

The hollow rebar 7 is any reinforcing material added to the security barrier 11 that is hollow, thereby allowing for the optical fiber 5 to pass within its interior. Preferably, the hollow rebar 7 is made of carbon steel, composites, or a combination thereof. In a preferred embodiment, the hollow rebar 7 is made of reinforced plastic fibers.

Preferably, the hollow rebar 7 is positioned within the security barrier 11 during the construction of the security barrier, preferably by a molding process, for example, but not limited to, pouring concrete, the cooling of a heated compound, the molding of a compounds after exposure to a solidifying gas or liquid or other solidification technique.

Preferably, the resulting hollow rebar 7 has a shape that allows for the easy insertion of the optical fiber 5 after the security barrier 11 is constructed, as the construction process may damage the optical fiber 5 or it may be desirable to replace or upgrade the optical fiber 5 in the future. Therefore, the hollow rebar 7 within the security barrier 11 preferably has an ovular shape having a single loop thereby allowing for the easy insertion of the optical fiber 5 into the hollow rebar 7 after construction of the security battier 11. Embodiments having an ovular shaped hollow rebar 7 are preferable as they provide for an easier and therefore lower cost manufacturing process. Preferably, an ovular shape within the security barrier 11 has no right angles, preferably no bends between 85 and 95 degrees and between 265 and 280 degrees. Preferably, the outer edge of the ovular shape within the security barrier 11 follows a consistent angle having a variance of no more than 10 degrees, more preferably 5 degrees, and even more preferably 1 degree. In a preferred embodiment, the hollow rebar 7 within the security barrier 11 has an oval shape.

In the alternative, hollow rebar 7 forming other shapes may be used, however, depending on the shape and the optical fiber 5 used, it may be desirable to construct the security barrier 11 with the optical fiber 5 in place, which may complicate construction.

Optical Receiver 9

The optical receiver 9 is any device capable of detecting the optical energy provided by the optical transmitter 3. Preferably, the optical receiver 9 is a photodiode or other photosensitive material producing an electrical output. In a preferred embodiment, the optical receiver 9 is a photodiode connected to an analog-to-digital converter (ADC) of the optical electronics 1, preferably through an operational amplifier to amplify the voltage provided by the photodiode to levels optimized for the ADC of the optical electronics 1.

Security Barrier 11

The security barrier 11 is any solid structure. Preferably, the security barrier 11 is made of concrete. Preferably, the security barrier 11 is formed to a shape optimal for securing against the threats of interest. For example, if explosives are a concern, the security barrier 11 is preferably shaped and orientated to mitigate damage from the anticipated explosives. Likewise, if a particular weapon fire is a concern, the security barrier 11 is preferably shaped and orientated to mitigate damage from the anticipated weapon ordinance. In one embodiment, the security barrier 11 is designed to withstand small firearm fire, explosive ordinances, or a combination thereof. In a preferred embodiment, the security barrier 11 is a the security barrier so Id under the trademark BATTLEGUARD by HIT.

FIG. 3

Figure 3:
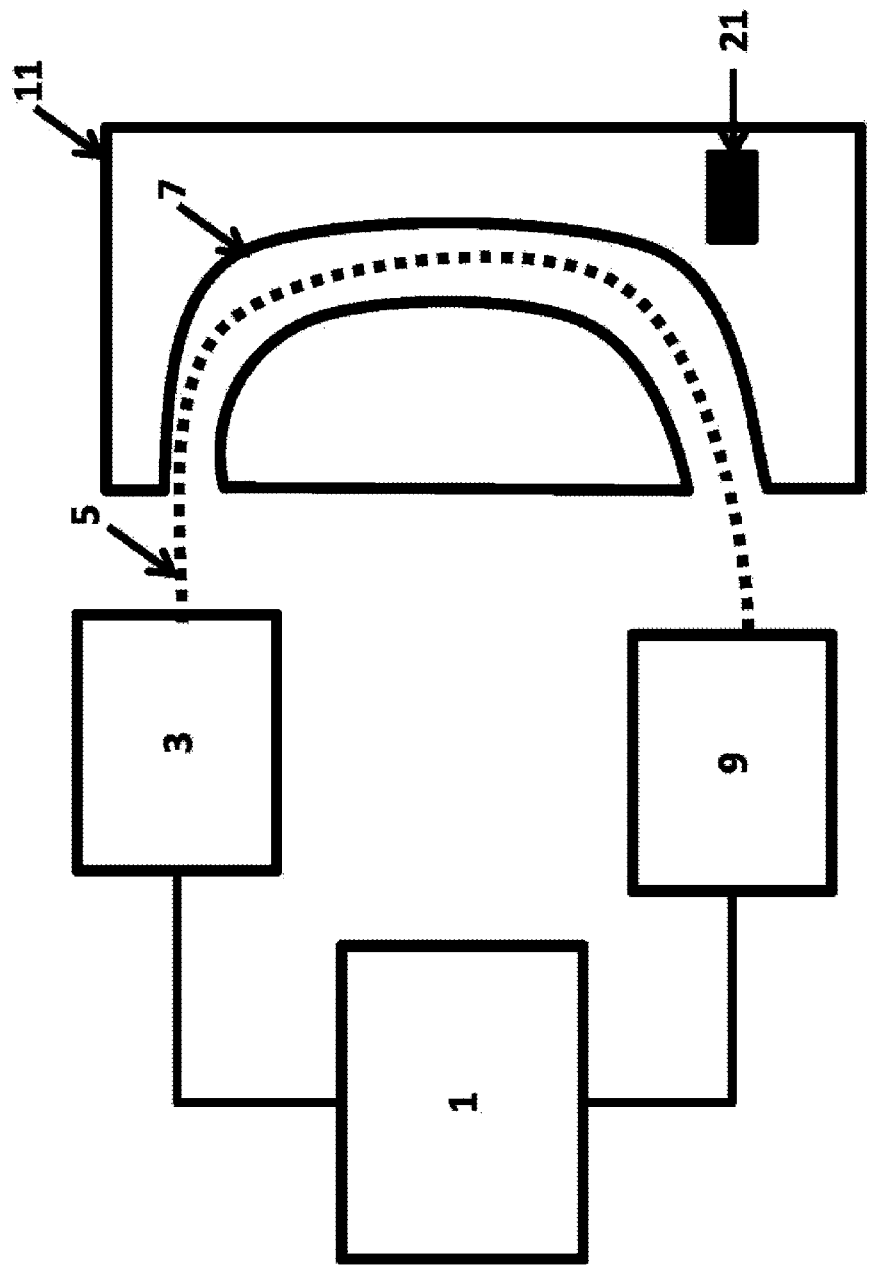
FIG. 3 depicts a cross-sectional view of one embodiment of a method and device for detecting impact events o n a security barrier comprising a camera.

FIG. 3 depicts one embodiment of a method and device for detecting impact events on a security barrier comprising a camera. As shown, the embodiment of FIG. 3 includes the optical electronics 1, optical transmitter 3, optical fiber 5, hollow rebar 7, optical receiver 9, and security barrier 11 as described above for FIG. 2. The embodiment in FIG. 3 also includes a camera 21. This embodiment is advantageous as it allows for a visual view of a site after an impact is detected using the above described methods.

Camera 21

The camera is any means of capturing images, preferably time-lapsed images or a video. Preferably, the camera 21 is mounted to or within the security barrier. Preferably, the camera 21 is a wireless camera transmitting a video feed to a remote location for monitoring (not shown for simplicity). In the alternate embodiment, the camera 21 is a wired camera, with the wires preferably secured preferably by the use of an underground conduit. Preferably, the camera is a pan-tilt-zoom (PTZ) camera that may be remotely controlled for remote viewing. Preferably, the camera s powered by an underground power line (not shown for simplicity), more preferably with a battery backup(not shown for simplicity).

FIG. 4

Figure 4:
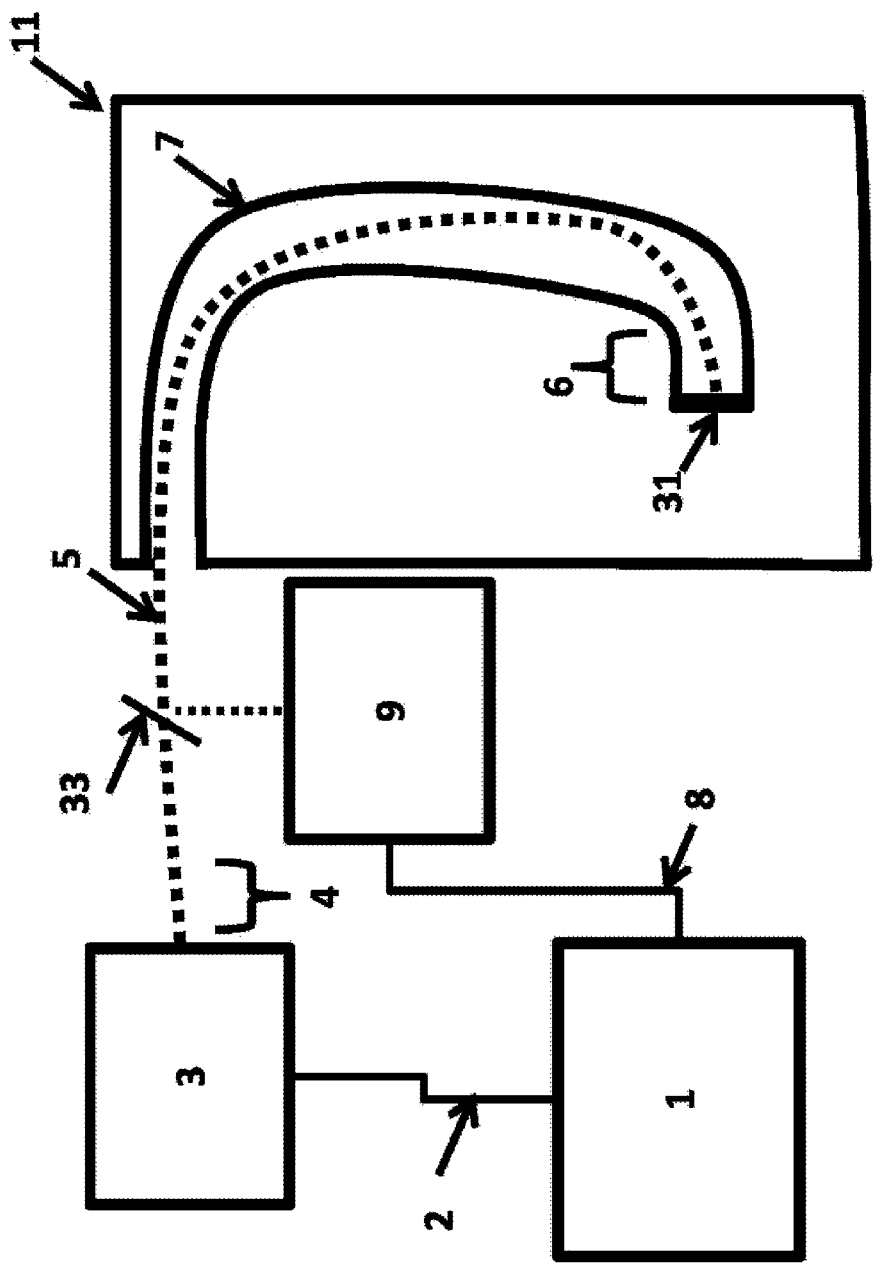
FIG. 4 depicts a cross-sectional view of one embodiment of a method and device for detecting impact events on a security barrier comprising an optical reflector on one end of the optical fiber.

FIG. 4 depicts one embodiment of a method and device for detecting impact events on a security barrier comprising an optical reflector on one end of the optical fiber. As shown, the embodiment of FIG. 4 includes the optical electronics 1, optical transmitter 3, optical fiber 5, hollow rebar 7, optical receiver 9, and security barrier 11 as described above. The embodiment in FIG. 4 also includes an optical reflector 31 and a beam splitter 33. This embodiment is advantageous as only one optical fiber 5 end is used outside of the security barrier 11 although the optics is somewhat complicated with the addition of the beam s glitter 33, and other optical filters to filter out the optical emissions no from the optical reflector 31 (preferably with optical filter or software filtering by the optical electronics 9.

In this embodiment, the optical electronics 1 are connected to the optical transmitter 3, preferably by one or more wires 2. The optical electronics 1 are also connected to the optical receiver 9, preferably by one or more wires 8. The beam splitter 33 optically connects the optical transmitter 3, optical receiver 9 and the optical reflector 31. The first end 4 of the optical fiber 5 is optically connected to the optical transmitter 3. The second end 6 of the optical fiber 5 is optically connected to the optical reflector 31, preferably within the security barrier 11.

The optical transmitter 3 provides an optical energy to the first end 4 of the optical fiber 5 through the beam splitter 33. The optical fiber 5 is positioned within the interior of a hollow rebar 7. The hollow rebar 7 is positioned within and completely surrounded by the security barrier 11. Optical energy provided by the optical source 3 passes through the optical fiber 5, within the hollow rebar 7 and within the security barrier 11, to the optical reflector 31. The optical reflector 31 at least partially reflects the optical energy back to the beam splitter 33 and finally to the optical receiver 9. The optical receiver 9 sends a signal to the optical electronics 1 related to the optical energy received. The optical electronics 1 processes the signals for disturbances from an impact event and reports any detected disturbances.

Optical Reflector 31

The optical reflector 31 at least partially reflects optical energy produced by the optical transmitter 3. Preferably, the optical reflector 31 has a reflective surface preferably by the use of two optically dissimilar materials. In one preferred embodiment, the optical reflector 31 reflects a polarized light back, for simplified filtering of optical energy not reflected by the optical reflector 31. Preferably, the optical reflector 31 substantially reflects optical energy. Preferable, "substantially reflects" as used herein is the reflection of the majority of optical energy, more preferably at least 75%, or even more preferably at least 90%, or still even more preferably at least 95% of optical energy.

In one embodiment, the optical reflector 31 includes a wave plate and a thin film mirror designed to cause a reflection and preferably a 90 degree rotation of polarization. Preferably the wave plate is about 0.25 inches thick. Preferably, for embodiments using a wave plate, the wave plate is made of Calcite, Mica, crystalline Quartz, or a combination thereof. Preferably, the mirror is made of fused quartz with a vapor deposited coating, either metallic or otherwise. Preferably, the mirror is coated with aluminum or silver for cost effectiveness.

In a preferred embodiment, the optical reflector 31 is a coating or otherwise embedded onto the second end 6 of the optical fiber 5. In the alternative embodiment, at least the part of the hollow mbar 7 exposed to the second end 6 of the optical fiber 6 functions as the optical reflector 31 described herein. In another alternative embodiment, at least the part of the security barrier 11 exposed to the second end 6 of the optical fiber 5 functions as the optical reflector 31 described herein.

Beam Splitter 33

The beam splitter 33 is any material that is capable of transferring optical energy between the optical transmitter 3, the optical receiver 9 and the optical fiber 5. Preferably, the beam splitter 33 is made of an optical substrate. The beam splitter preferably comprises a thin glass slide or a partially reflecting dielectric thin film coating on an optical substrate. Partially reflecting thin film coatings are preferably made of Aluminum, Silver, Gold, Silicon, Titanium, Tantalum, Zirconium, Hafnium, Scandium, Niobium, oxides thereof, fluorides thereof or combinations thereof. More preferably, the coatings preferably comprise materials with various indices of refraction for example, but not limited to, as $Al_2O_3$, $Ta_2O$, $SiO_2$, $TiO_2$, $CaF_2$, $ZrO_2$, $BeO_2$, $MgF_2$, $LaF_3$. and $AlF_3$ or combinations thereof.

In a preferred embodiment, the beam splitter is made of fused silica with thin films deposited on the secondary downstream face to tune the operating wavelength and the reflectivity and an anti-reflection coating on the primary upstream face to improve transmission and reduce undesirable optical effects such as additional off-axis reflections and ghosting of the primary optical signal. The partially reflecting thin film is preferably constituted primarily of alternating layers of low index of refraction materials whose presence or absence can be used to tune the reflectivity and the center wavelength to the desired area of operation. The thin films are preferably made up of Aluminum, Silver, Gold, or oxides of silicon, titanium, tantalum, zirconium, hafnium, scandium, niobium or combinations thereof. The anti-reflection coatings preferably comprise a thin film of magnesium fluoride.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

All publications and patent documents cited in this application are incorporated by reference in their entirety for all purposes to the same extent as if each individual publication or patent document were so individually denoted.

Any element in a claim that does not explicitly state "means for" performing a specified function, or "step for" performing a specific function, is not to be interpreted as a "means" or "step" clause as specified in 35 U.S.C. §112, ¶6. In particular, the use of "step of" in the claims herein is not intended to invoke the provisions of 35 U.S.C. §112, ¶6.

I claim:

1. A device for the detection of impact events on a security barrier comprising:
    a) a security barrier, a hollow rebar, a. motion sensing optical fiber, optical transmitter, optical receiver, and optical electronics,
    b) said security barrier forming a solid structure;
    c) said hollow rebar positioned within said security barrier;
        a. wherein the hollow rebar provides structural reinforcement to the security barrier, and
        b. wherein the hollow rebar allows insertion and removal of the optical fiber;
    d) said security barrier completely surrounding said hollow rebar;
    e) said hollow rebar comprising an interior;
    f) said optical fiber passing through said interior of said hollow rebar;
    g) said optical transmitter producing an optical energy;
    h) said optical transmitter optically connected to said optical fiber whereby said optical energy from said optical transmitter passes through said optical fiber;
    i) said optical receiver optically connected to said optical fiber whereby said optical energy from said optical transmitter is received by said optical receiver through said optical fiber;
    j) said optical transmitter and said optical receiver connected to said optical electronics;
    k) said optical electronics comprising a computer, microcontroller, application-specific integrated circuit, an embedded system, or a combination thereof and configured to detect disturbances within said optical fiber from said optical energy received by said optical receiver; and,
    l) said optical electronics having a means for providing notification of the detection of an impact event at said security barrier upon said detection of disturbances within said optical fiber exceeding a predetermined deviation threshold.

2. The device for the detection of impact events on a security barrier of claim 1 whereby:
    a) said security barrier comprises concrete.

3. The device for the detection of impact events on a security barrier of claim 1 whereby:
    a) said hollow rebar forms an ovular shape within the security barrier.

4. The device for the detection of impact events on a security barrier of claim 1 further comprising:
    a) a camera mounted to or within said security barrier.

5. The device for the detection of impact events on a security barrier of claim 1 whereby:
    a) said optical fiber comprises a first end and a second end;
    b) said first end of said optical fiber optically connected to said optical transmitter; and
    c) said second end of said optical fiber optically connected to said optical receiver.

6. The device for the detection of impact events on a security barrier of claim 5 whereby:
    a) said hollow rebar forms an ovular shape within the security barrier.

7. The device for the detection of impact events on a security barrier of claim 6 whereby:
    a) said security barrier comprises concrete.

8. The device for the detection of impact events on a security barrier of claim 7 further comprising:
    a) a camera mounted to or within said security barrier.

9. The device for the detection of impact events on a security barrier of claim 8 whereby:

a) said predetermined deviation threshold is optimized to detect small firearm fire directed at said security barrier.

10. The device for the detection of impact events on a security barrier of claim 1 further comprising:
 a) a beam splitter and an optical reflector; and whereby;
 b) said optical fiber comprises a first end and a second end;
 c) said first end of said optical fiber optically connected to said beam splitter;
 d) said second end of said optical fiber optically connected to said optical reflector; and
 e) said beam splitter optically connected to said optical receiver and said optical transmitter.

11. The device for the detection of impact events on a security barrier of claim 10 whereby:
 a) said hollow rebar forms an ovular shape within the security barrier.

12. The device for the detection of impact events on a security barrier of claim 11 whereby:
 a) said security barrier comprises concrete.

13. The device for the detection of impact events on a security barrier of claim 12 whereby:
 a) said optical reflector is a coating or otherwise embedded on the second said second end of said optical fiber.

14. The device for the detection of impact events on a security barrier of claim 12 whereby:
 a) said optical reflector is a coating or otherwise embedded on the structural hollow rebar exposed to said second end of said optical fiber.

15. The device for the detection of impact events on a security barrier of claim 12 whereby:
 a) said optical reflector is a coating or otherwise embedded on the security barrier exposed to said second end of said optical fiber.

16. The device for the detection of impact events on a security barrier of claim 12 further comprising:
 a) a camera mounted to or within said security barrier.

17. The device for the detection of impact events on a security barrier of claim 16 whereby:
 a) said predetermined deviation threshold is optimized to detect small firearm fire directed at said security barrier.

* * * * *